(No Model.)  3 Sheets—Sheet 1.
H. W. CAMPBELL.
SAFETY MONEY ORDER.
No. 456,885.  Patented July 28, 1891.
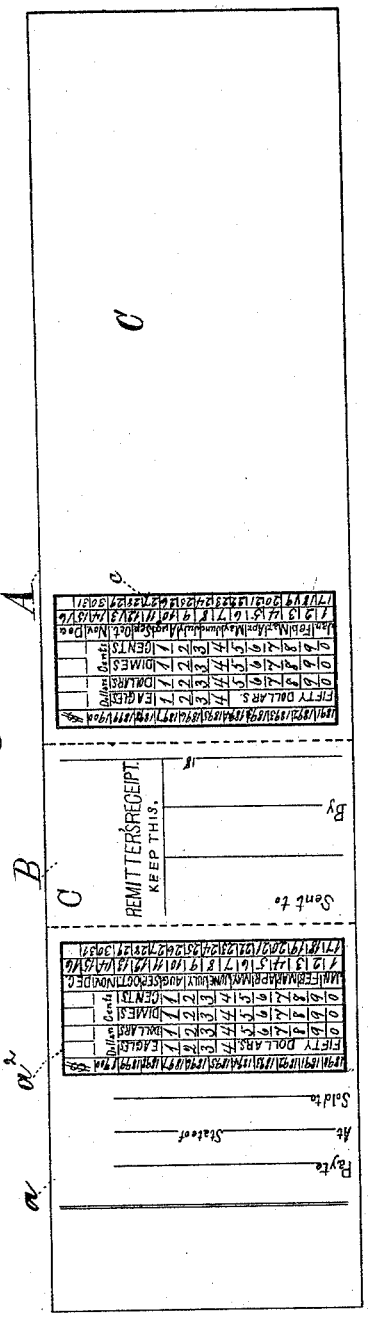
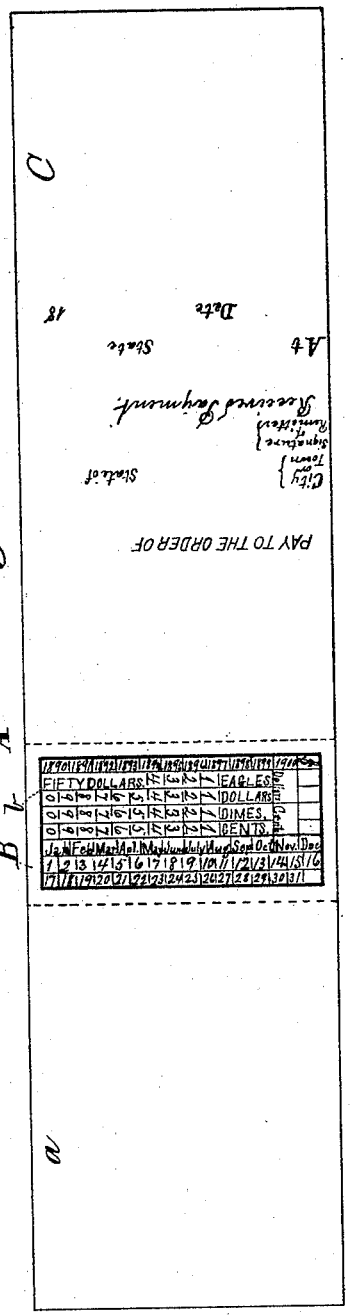
Witnesses.
J. K. Nunnan
Albert Speiden
Inventor.
Hardy W. Campbell,
per M. F. Chamblin & Co.
Attys.
THE NORRIS PETERS CO., PHOTO-LITHO., WASHINGTON, D. C.

(No Model.) 3 Sheets—Sheet 2.

H. W. CAMPBELL.
SAFETY MONEY ORDER.

No. 456,885. Patented July 28, 1891.

Witnesses.
J. K. Newman
Albert Speiden

Inventor.
Hardy W. Campbell,
per
M. F. Chamblin & Co.
Attorney.

(No Model.)  3 Sheets—Sheet 3.

H. W. CAMPBELL.
SAFETY MONEY ORDER.

No. 456,885.  Patented July 28, 1891.

Witnesses.
J. K. Newman
Albert Speiden

Inventor.
Hardy W. Campbell,
Per
M. F. Chamblin & Co
Attys.

UNITED STATES PATENT OFFICE.

HARDY W. CAMPBELL, OF RACINE, WISCONSIN, ASSIGNOR OF ONE-HALF TO CHARLES J. STROMBERG, OF CHICAGO, ILLINOIS.

SAFETY MONEY-ORDER.

SPECIFICATION forming part of Letters Patent No. 456,885, dated July 28, 1891.

Application filed May 12, 1890. Serial No. 351,444. (No model.)

*To all whom it may concern:*

Be it known that I, HARDY W. CAMPBELL, a citizen of the United States, residing at Racine, in the county of Racine and State of Wisconsin, have invented certain new and useful Improvements in Safety Money-Orders; and I do hereby declare the following to be a full, clear, and exact description of the invention, such as will enable others skilled in the art to which it appertains to make and use the same.

My invention relates to a safety money-order which can be used effectually by express companies, the Post-Office Department, and in any business where duplicates or triplicates are needed to correspond in amount and dates.

The object of my invention is to provide a safety money order or draft in which the amount for which same is drawn and the date drawn cannot possibly be changed, raised, or altered, and so arranged that the two or three forms usually required in doing business in said respects are quickly, accurately, and easily prepared. I attain said object by a certain combination and arrangement of parts fully described in this specification, and illustrated in the accompanying drawings, in which—

Figure 1 is a view completely illustrating one side of a ticket embodying the invention. Fig. 2 is a similar view of the other side. Fig. 3 is a view of the ticket when folded in book form for use. Figs. 4, 5, and 6 are similar views showing the different phases of the ticket when the same has been used.

A designates the money-order, &c., complete, and it comprises the stub $a$ to be retained by the party or company issuing same, the remitter's receipt B, and the order or draft C to be sent or remitted. The stub $a$ may contain the directions for use, and is designated by some suitable letter of the alphabet, which denotes the series, and has a blank space for the number of same, the name of the party to whom payable, the place where payable, &c., and upon the end adjacent the remitter's receipt there is a calendar of dates and amounts for the period of any number of years and for the sum of any number of dollars, whereby the agent is enabled to correctly and quickly register the date of issuance and the amount of dollars and cents for which issued. For example, a similar calendar $a^2$ is upon the end of the stub adjacent the remitter's receipt, (see Fig. 1,) which includes the period of ten years, beginning at the year 1890 and closing at the year 1900. By the aid of same the date of day and year can be registered. Upon the margin of said calendar $a^2$ there are blank spaces for eagles, dollars, dimes, cents, &c. Underneath of same there are to be found the numbers 1, 2, 3, 4, 5, 6, 7, 8, 9, and the cipher 0, by means of which the agent using the order is enabled to register any amount in dollars and cents. The remitter's receipt B contains a corresponding calendar $b$ of dates and amounts. Upon one side of same is written the words "Remitter's Receipt" and the name of the company, &c., sending the same, also a blank space for the recording of the name of the person to whom sent and by whom sent, the date of sending, and a space for the number of same. The order C contains also a calendar $c$ of dates and amounts upon the end adjacent the remitter's receipt, corresponding to the calendars $a^2$ and $b$, heretofore described, also a blank space for recording the number. Upon the back of said order there are also blank spaces to write the name of the person to whom the order is to be paid or may be paid, the place and date of payment, the signature of remitter, and the name of the remittee or receiver.

The front side of the order C of course must be made to correspond to circumstances, as well as some of the features of the stub and remitter's receipt, and it would be immaterial to describe the same, as the novel, useful, and practical features of my invention consist in the three calendars of dates and amounts, the blank spaces for the number and series, &c., and the art of so folding and arranging said calendars that the uniform amount desired to be registered and the date of registering can all be done by the use of the punch only once.

It will readily be observed by examining Fig. 3 that the folding of the calendars $a^2$ $b$ $c$, respectively, is such that corresponding figures and dates come directly over each other.

The value and efficiency of my invention may be fully understood by examining the features of Figs. 4, 5, and 6, wherein an order of "Series C, No. 1481," has been issued by the agent, A. J. Armes, of the United States Express Company, at Burlington, Vermont, payable to A. Williams, remittee, and issued to J. Jones, remitter, upon March 2, in the year 1890, for the sum of eight dollars.

It will be readily observed that it is impossible to raise the amount for which the order is issued, because the amount is written—viz., $8—and the blank denomination preceding it, as well as the corresponding figures of each denomination, are punched out. Again, it will be seen that the numbers are so arranged that by punching out the lowest denomination on the line opposite $ will prevent any figures from being added, &c.

Having fully described my invention, what I claim and desire to secure by Letters Patent, is—

A safety money-order comprising three coupons—namely, the stub to be retained by the person issuing the same, the remitter's receipt, and the order or draft to be remitted—each of said coupons being arranged and provided alternately and upon opposite sides with the calendars $a^2$, $b$, and $c$, provided with a series of numbers, &c., for registering the amount of money sent and the date upon which the same is sent, so that when the coupons are folded or superimposed one upon the other they coincide exactly, whereby the three can be simultaneously and correspondingly punched, thereby affording an accurate triplex record, substantially as described, and for the purpose set forth.

In testimony whereof I affix my signature in presence of two witnesses.

HARDY W. CAMPBELL.

Witnesses:
WM. HENRY MILLER,
FRANK E. JARVIS.